Dec. 30, 1969  S. J. LEPIANKA  3,487,347
COILS HAVING EDGES OF INSULATING SHEETS
IN GROOVES OF BOBBIN FLANGES
Filed May 9, 1968

INVENTOR
STANLEY J. LEPIANKA

BY *Glenn H. Antrim*

ATTY.

United States Patent Office 3,487,347
Patented Dec. 30, 1969

3,487,347
COILS HAVING EDGES OF INSULATING SHEETS IN GROOVES OF BOBBIN FLANGES
Stanley J. Lepianka, Streamwood, Ill., assignor to Automatic Electric Laboratories, Inc., Northlake, Ill., a corporation of Delaware
Filed May 9, 1968, Ser. No. 727,896
Int. Cl. H01f 5/06
U.S. Cl. 335—299       6 Claims

ABSTRACT OF THE DISCLOSURE

Molded flanges of relay cores or bobbins for solenoid windings have grooves in the inner faces thereof to receive the edges of insulating tape applied between windings. The use of the grooves accommodate tape of sufficient width to provide low-leakage paths around edges of the tape. Without the use of grooves, the edges of the tape tend to fold over while the tape is being applied so that the ends of the different windings are not sufficiently well insulated.

BACKGROUND OF THE INVENTION

This invention pertains to electromagnetic coils and particularly to coils having grooves in end flanges to aid in machine application of insulation between layers of windings of coils.

Different methods of applying insulation between windings have been used according to the general way in which the coils are manufactured. When the coils are wound in stick form on a common arbor, insulating sheets applied between the windings protrude beyond the ends of the windings after the individual coils have been cut apart. After the wire leads of the coils are pulled out to be accessible, the edges of the insulating sheets are coalesced together, and spool heads or flanges are assembled to the ends of the coils. In a different process where flanges with smooth faces have already been placed on the cores before the windings are started, the edges of insulating sheets are formed as the sheets are applied. Insulating sheet is usually applied by hand between windings, and it is slightly wider than the distance between the inner faces of the flanges so that the edges can be carefully pressed outwardly against the respective faces of the flanges.

Smaller relays than those in general use are now required in telephone systems. The smaller coils required for these new relays cannot be readily manufactured by the processes now in general use. Since the new coils are wound with smaller gauge wire, the amount of electrolysis that can be tolerated before the coils become open is much less than that previously. In order to decrease the amount of electrolysis, leakage between windings must be decreased by using different insulating materials with improved insulating qualities; and for more economical production, the material is to be applied by machine. When an attempt was made to apply desired insulating tape by machine over windings applied between flanges having smooth surfaces, its edges tended to fold over so that the tape did not completely isolate the two windings between which it is placed.

SUMMARY OF THE INVENTION

Each flange at the end of a core or bobbin has a groove molded in its inner face for receiving an edge of insulating tape. The insulating tape is wound, preferably by a wrapping machine, over an inner winding that is to be thoroughly insulated from an outer winding. To provide extremely high leakage paths across the edges of the insulating tape, it is wide enough to extend beyond the ends of the windings into the grooves. Because in mass production the width of the tape cannot be controlled exactly, allowance is made for the tape to extend at times beyond the windings more than the depth of the grooves. The grooves have sufficient widths to accommodate the slightly excess amount of the tape by bending the tape outward so that its extreme edges lie outward against the bottom of the grooves. To aid in bending the edge of the tape outward, that side of each groove nearer the hub or the core may be beveled. The edge of the tape positioned in the groove is not disturbed by application of an outer winding and provides relatively long leakage paths between the windings. To isolate leads of the inner windings from the outer windings, channels in the flanges are provided across the grooves where lead wires are to be passed under the edge of the insulating tape. A relay coil of this construction provides reliable service even though its environment is humid, and voltage is applied continually between its windings.

DESCRIPTION OF THE PREFERRED EMBODIMENT

Figure 1:
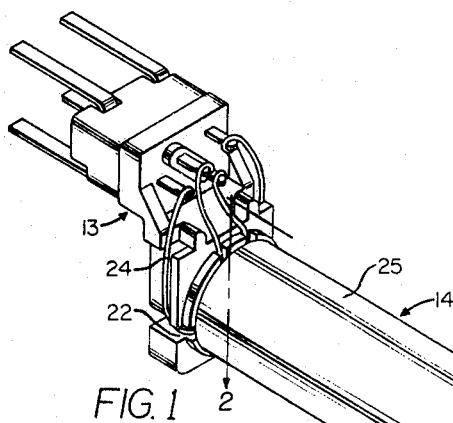
FIG. 1 is an isometric view of a telephone line relay coil embodying the invention.

The relay coil shown in FIG. 1 is particularly suitable for use in a telephone line relay. The coil assembly has a magnetic core 11 with a disk-shaped, molded, insulating, front flange 12 staked to one end, and a molded, insulating, rear flange 13 and integral terminal portion staked to the other end. Windings and required insulation are applied in the winding space 14 on the core 11 between the flanges 12 and 13. A typical line relay coil as shown has two windings of nearly the same impedance under operating conditions.

Figure 2:
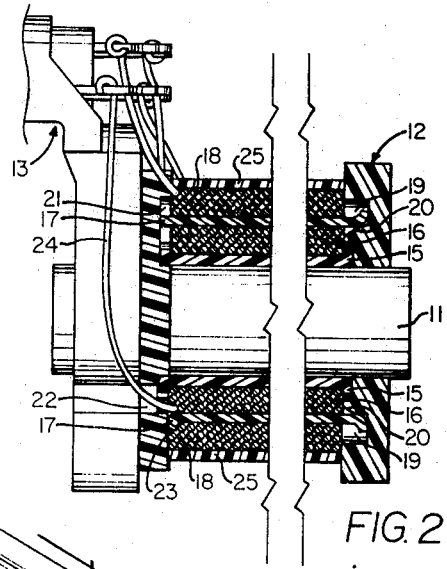
FIG. 2 is a partial cross-section view taken on the line 2—2 of FIG. 1.

The placement of the windings and the layers of insulation will be more readily understood with reference to FIG. 2. A cylindrical insulating sleeve 15 having flared ends to facilitate insertion of its core, fits closely about the core 11, and its flared ends extend into grooves molded into the flanges 12 and 13 to provide good insulation between the core 11 and an inner winding 16. About 1¼ turns of insulating sheet 17 are applied over the inner winding 16, and then an additional solenoid winding 18 is wound over the sheet 17. Finally an insulating cover 25 is wrapped over the outer winding 18.

Figure 3:
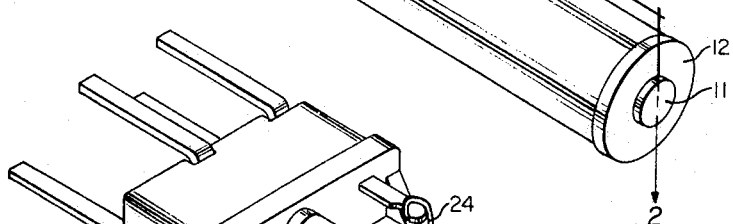
FIG. 3 is an isometric view of the terminal end of the relay coil of FIG. 1 with the outer winding removed to show the position of an edge of insulating tape in a groove of the rear flange.
Figure 4:
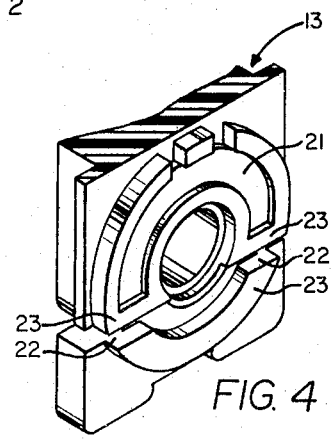
FIG. 4 is a perspective view of the inner face of the rear flange.
Figure 5:
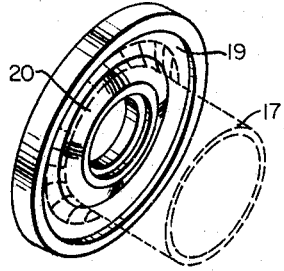
FIG. 5 is a perspective view of the inner face of the front flange at the armature end of the relay coil.

As best seen in FIGS. 3 and 4, a groove 21 in the inner face of the rear flange 13 is shown for receiving an edge of the insulating tape 17 wrapped over the inner winding, and as shown in FIG. 5, an annular groove 19 in the inner face of the front flange 12 is provided for receiving the opposite edge of the tape 17. For illustrative purposes, the widths of the grooves are shown exaggerated. The inner edge 20 of the groove 19 is beveled to aid in bending the edge of the tape 17 outward against the bottom face of the groove 19 while the tape is applied, to an extent dependent upon variations in the tolerance of the width of the tape. The diameter of the inner edges of the grooves 19 and 21 is approximately the same as the outside diameter of the winding 16 such that the sides of the grooves 19 and 21 nearer the core or hub 11 are even with the outer layer of the inner winding 16 on which the insulating tape 17 is to be applied. The width of the bottom face of the groove may be about .060", and the depth may be about .035".

The inner face of the rear flange 13 as shown in FIG. 4 does not have a complete circular groove such as the groove 19 of FIG. 5 because channels 22 are required for conducting terminal wires 24, as shown in FIG. 3, from the inner winding 16 to terminals supported by the rear flange. The groove 21 extends more than one-half way around the face of the flange 13 and receives a portion of the adjacent edge of the tape 17 somewhat in the same manner that the groove 19 of FIG. 5 receives the entire opposite edge. However, the inner edge of the groove 21 need not be beveled as described for FIG. 5 to bend excess tape outward. Usually the edge of the tape 17 extending into the groove 21 is placed so that it does not extend beyond the depth of the groove.

Lands 23 are provided on each side of each of the channels 22 transverse the groove 21 such that the portion of the edge of the tape away from the groove 21 is bent outward against the surfaces of the lands, and the tape and the outer winding 18 (FIG. 2) span the channels 22 so that they are spaced apart from the terminal wires 24 positioned within the channels. The land 23 opposite the channel 21 shown in FIG. 4 might include within its central portion a continuation of the groove 21, but the additional groove is not necessary, and its inclusion complicates the process for molding the flange 13. The channels 22 communicate through notches in the edge of the flange 13 so that the terminal wires 24 can be directed back of the flange away from the outer winding 18 to respective terminals mounted in the flange.

In a typical telephone line relay, the distance between the flanges 12 and 13 of its coil is 2.600", and the specified width of the insulating tape 17 is .070" greater than the distance between them. Preferably the width of the tape 17 is maintained within .005" of its specified width. A polyester film-mat tape with an overall thickness of .0065" provides excellent insulation. The flanges 12 and 13 are preferably molded from 30 percent glass filled nylon, and the wire for the windings 16 and 18 is insulated with a polyurethane coating. These types of insulating materials and the construction shown in FIG. 2 for providing a long leakage path around the edge of the tape 17 assures low leakage and prevents electrolysis even when voltage is continually applied between the windings 16 and 18 in an environment of high humidity.

What is claimed is:

1. In an electromagnetic coil assembly of the type having a hub, first and second flanges spaced apart on said hub to define a winding space, a plurality of layers of solenoid winding between said flanges including a first layer and a subsequently wound adjacent second layer, and flexible insulating sheet wound between said first and second layers to provide low-leakage insulation therebetween;

each of said flanges having a groove in its inner surface facing said winding, that side of said groove nearer said hub being approximately even with said first layer, the width of said insulating sheet being slightly wider than the distance between the inner faces of said flanges such that the edges of said insulating sheet at the ends of said winding extend into adjacent ones of said grooves.

2. In an electromagnetic coil assembly as claimed in claim 1, in which at least one terminal wire of said winding extends from the portion of the winding enclosed within said insulating sheet outward between one of said flanges and the adjacent edge of said insulating sheet, a channel in the inner face of said one flange transverse said groove, and a land transverse said groove at each side of said channel, said terminal wire being positioned in said channel to isolate it from said layers of winding applied over said insulating sheet.

3. In an electromagnetic coil assembly as claimed in claim 1 in which that side of said groove near said hub in one of said flanges is beveled, said beveled portion being effective to turn any small excess edge of said insulating sheet outwardly along the bottom surface of said groove of said one flange.

4. A relay coil comprising, a cylindrical core having first and second molded insulating flanges secured to respective ends thereof, a sleeve of insulating material on said core extending between said flanges, a first solenoid winding wound on said sleeve, each of said flanges having molded in their inner face an arcuate groove concentric with said core, each of said grooves having an inner diameter equal to the outer diameter of said first winding, a sheet of insulating tape wrapped around said first winding, the width of said tape being sufficiently greater than the distance between the inner faces of said flanges that each edge of said tape at the ends of said first winding extend into a respective adjacent one of said grooves, and a second solenoid winding wound over said tape.

5. A relay coil according to claim 4 in which a channel is molded transverse said groove of said first flange, said channel having on each side thereof a land across said groove which it transverses to prevent said second winding from entering said channel, and a terminal wire of said first winding extending outwardly through said channel.

6. A relay coil as claimed in claim 5 in which the inside edge of said groove in the face of said second flange is beveled to aid in bending excess tape outwardly against the bottom of said last-mentioned groove.

References Cited

UNITED STATES PATENTS 2,998,583 8/1961 Worcester _____ 336—206

FOREIGN PATENTS 1,028,874 5/1966 Great Britain.
1,104,607 4/1961 Germany.

G. HARRIS, Primary Examiner

U.S. Cl. X.R.

336—206